Aug. 14, 1956  L. L. MYERS  2,758,486
CONTROL MECHANISM
Filed Nov. 4, 1950  2 Sheets-Sheet 2
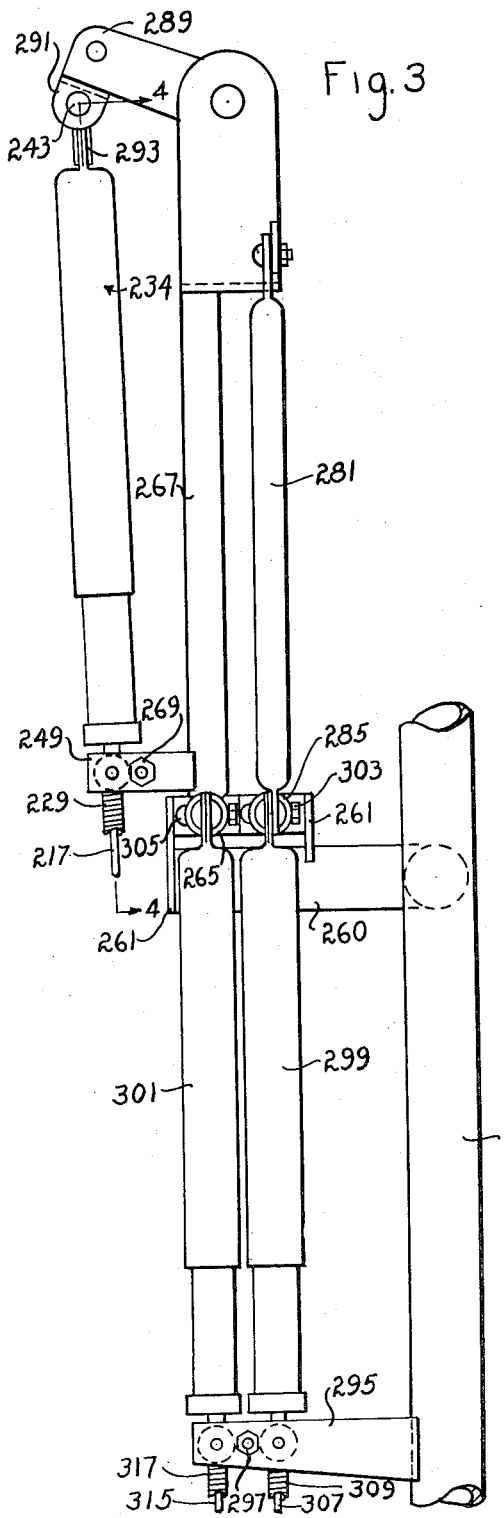
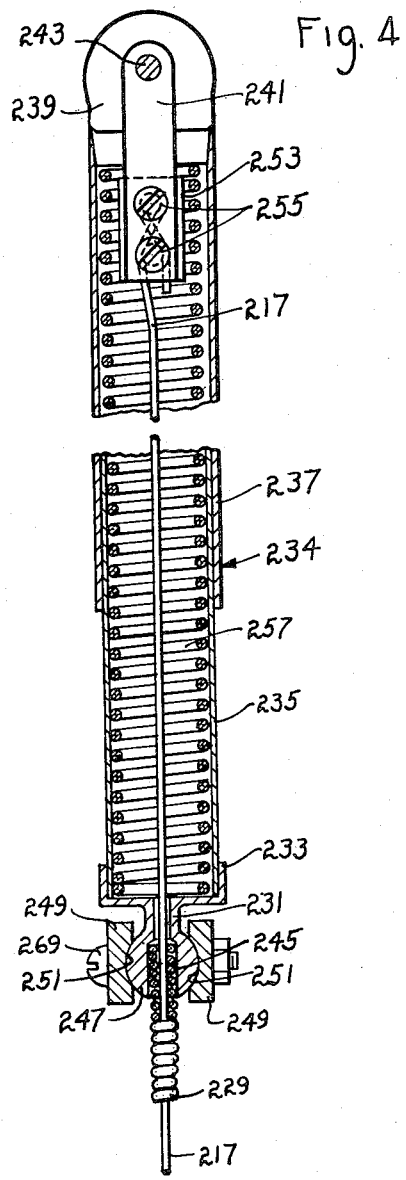
LESTER L. MYERS
INVENTOR.
BY Edmund W. E. Kamm
ATTORNEY

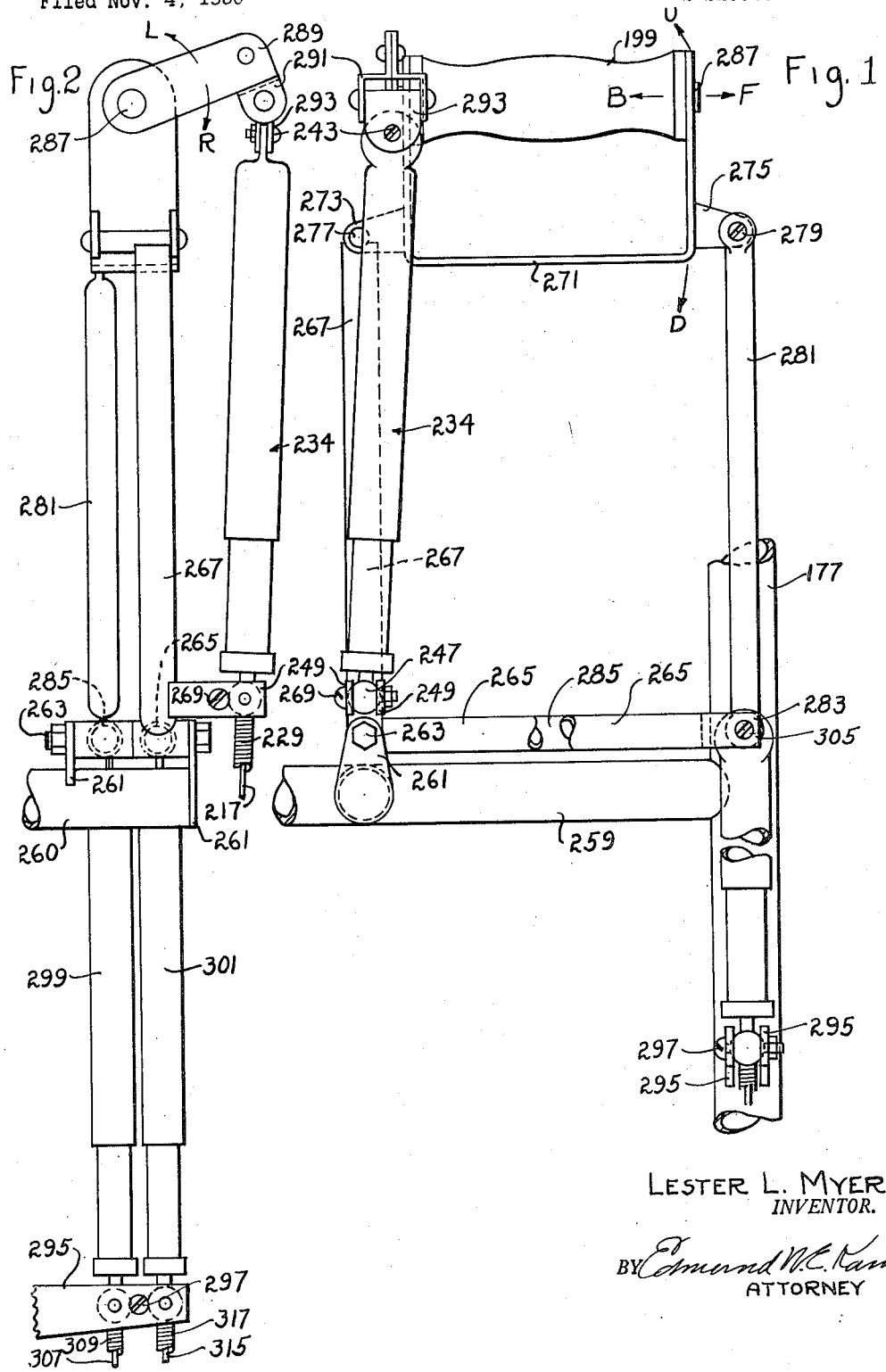

United States Patent Office 2,758,486
Patented Aug. 14, 1956

2,758,486
CONTROL MECHANISM

Lester L. Myers, Fort Wayne, Ind., assignor to Mobile Aerial Towers, Inc., Fort Wayne, Ind., a corporation of Indiana Application November 4, 1950, Serial No. 194,049

3 Claims. (Cl. 74—471)

This invention relates to a control mechanism. More specifically, it relates to a mechanism which is controlled by an operator who is carried at the end of the upper boom of a crane so that he may, by the operation of suitable controls position himself at any point in space which is within the range of operation of the crane.

Still another object of the invention is to provide a control mechanism which will be easy to operate.

Yet a further object of the invention is to provide a simplified control system which can be operated with one hand.

These and other objects will become apparent from a study of this specification and the drawings which are attached hereto, made a part hereof and in which:

Figure 1 is a side elevation of the unified direction control mechanism.

Figure 2 is an elevation of the mechanism of Figure 1 viewed from the left of said figure.

Figure 3 is an elevation of the mechanism of Figure 1 viewed from the right of said figure.

Figure 4 is a sectional view of a spring barrel taken substantially on the line 4—4 of Figure 3.

It is an object of the invention to provide a simplified control mechanism which when operated in a particular direction will result by means not shown in the movement of the operator in such direction. Thus, if the operator desires to be lifted or lowered he will lift or lower the control handle 199. If he desires to turn right or left he turns the control handle 199 clockwise or counterclockwise. If he wishes to go forward or rearward he moves the handle 199 forward or rearward.

The end of cable 217 (Fig. 4) is inserted through an axial hole 231 in the bottom head 233 of a spring barrel, indicated generally by 234. The lower tube 235 thereof telescopes into the upper tube 237 which has its other end 239 flattened. An anchor bar 241 is inserted in the end of the tube before it is flattened and both the flattened end and the anchor bar are perforated to receive a pivot bolt 243.

The bottom head is counterbored at 245 to receive the end of the cable sheath 229 which is frictionally or otherwise held therein. The head is also formed with a spherical knob 247 which is received between two clamping members 249 formed with sockets 251 to receive the knob 247.

The upper end of the cable 217 is fastened to the anchor bar by means of a clamping plate 253 and screws 255.

A compression spring 257 is enclosed in the barrel and tends to tension the cable 217.

As shown, particularly in Figures 1 and 2, members 259, 260 form a part of the operator's platform railing 177. Member 260 has a pair of brackets 261 fixed to extend upwardly from it. A pivot bolt 263 is supported therein and a bell crank lever 265—267 is pivotally mounted on the bolt.

The clamping members 249 project laterally from lever 267 and are drawn together by bolt 269 to support the ball of the spring barrel.

The handle bracket 271 has projections 273, 275 extending from each end. Projection 273 is pivotally mounted at 277 to the arm 267 of the bell crank. The other projection 275 is pivotally connected at 279 to a link 281 which is pivotally connected at 283 to an arm 285, the latter being pivotally mounted on the bolt 263.

The handle 199 is fixed to a shaft 287 which is rotatably mounted in the bracket 271 and carries the lever 289. A yoke 291 is fixed to the free end of the lever and pivotally carries a clevis 293 which receives the end 239 of the barrel 234 and the bolt 243.

Thus the spring barrel 234 will be extended or compressed as the handle 199 is turned counterclockwise or clockwise respectively in Figure 2. The cable 217 is either tensioned or compressed accordingly to actuate its valve.

A pair of clamping arms 295 extend from the rail 177 (Figs. 2 and 3) and are provided with sockets and a bolt 297 to receive the ball ends of the spring barrels 299 and 301 respectively which are constructed in the same manner as the barrel 234 shown in Figure 4.

The upper end of the barrel 299 is pivotally connected by bolt 303 to the ends of the link 281 and lever 285 while the upper end of barrel 301 is pivotally connected by bolt 305 to the arm 265 of the bell crank.

To raise the platform, the operator will tilt the handle upward about pivot 277 as shown by the arrow "U" in Fig. 1 to tension cable 307.

In operation, assume that the handle 199 is rotated clockwise about pivot 277, in the direction of the arrow "D" (Fig. 1) the device being controlled will be lowered.

Assume that the handle is moved in the direction of arrow "F" (Fig. 1). This tilts the bell crank 267—265 clockwise and compresses the cable 315 to move the controlled device forward (the direction faced by the operator).

If the handle is moved in the direction of arrow "B," the cable 315 will be tensioned to move the controlled device backward.

When it is desired to traverse the device to the right, the handle 199 is rotated clockwise in the direction of arrow "R" (Fig. 2).

If the handle is rotated to the left as indicated by arrow "L" in Fig. 2, the operation just described is reversed.

It will be seen from the above that the controls are operated in the direction which it is desired to have the device move and the mechanism responds in the same direction so that the manipulation of the control is natural and easily mastered.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a control mechanism having a neutral position, a fixed member, a bell crank pivotally supported on said member and comprising first and second arms, a second lever pivotally mounted on said member and extending in parallel side-by-side relation with said first arm of said bell crank, a third lever pivotally mounted on the second arm, a link connecting said third lever and second lever, said third lever and link serving to form substantially a parallelogram with said bell crank, a first control member pivotally connected to and depending from said first arm and a second control member pivotally connected to and depending from said second lever, said pivotal connections being substantially coaxial when the mechanism is in neutral position whereby when said third lever is translated endwise the bell crank will actuate the first control and when said third lever is pivoted about said second arm the link and second lever will actuate said second control, and a handle rotatably mounted on said third lever having its axis substantially parallel thereto, an arm connected to be rotated by said handle, a third control connected to be operated by said arm and a coupling member connecting said third control to said second arm.

2. In a control mechanism, a fixed member, a bell crank pivotally supported on said member and comprising first and second arms, a second lever pivotally mounted on said member and extending in parallel side-by-side relation with said first arm of said bell crank, a third lever pivotally mounted on the second arm, a link connecting said third lever and second lever, said third lever and link serving to form substantially a parallelogram with said bell crank, a first control member connected to said first arm and a second control member connected to said second lever, whereby when said third lever is translated endwise the bell crank will actuate the first control and when said third lever is pivoted about said second arm the link and second lever will actuate said second control, and a handle rotatably mounted on said third lever having its axis substantially parallel thereto, an arm connected to be rotated by said handle and a third control connected to be operated by said arm.

3. In a control mechanism having a neutral position, a fixed member, a bell crank pivotally supported on said member and comprising first and second arms, a second lever pivotally mounted on said member and in juxtaposition with said first arm of said bell crank, a third lever pivotally mounted on the second arm, a link connecting said third lever and second lever, said third lever and link serving to form substantially a parallelogram with said bell crank, a first control member pivotally connected to and depending from said first arm and a second control member pivotally connected to and depending from said second lever, said first and second control members being substantially parallel with said link when in neutral position, whereby when said third lever is translated endwise the bell crank will actuate the first control and when said third lever is pivoted on said second arm the link and second lever will actuate said second control and a handle rotatably mounted on said third lever having its axis substantially parallel thereto, an arm connected to be rotated by said handle, a third control connected to be operated by said arm and means connecting said third control to said second arm whereby said third control will be actuated only by rotation of said handle.

References Cited in the file of this patent

UNITED STATES PATENTS

| | | |
|---|---|---|
| 1,350,992 | Downie | Aug. 24, 1920 |
| 1,658,554 | Denyes | Feb. 7, 1928 |
| 1,861,511 | Russell | June 7, 1932 |
| 1,891,208 | Schuetz | Dec. 13, 1932 |
| 2,146,166 | Anthony et al. | Feb. 7, 1939 |
| 2,179,442 | Wolz | Nov. 7, 1939 |
| 2,241,527 | Schieferstein | May 13, 1941 |
| 2,331,790 | Nickols | Oct. 12, 1943 |
| 2,365,169 | Billings | Dec. 19, 1944 |
| 2,370,661 | Hayes | Mar. 6, 1945 |
| 2,383,172 | Wagner et al. | Aug. 21, 1945 |
| 2,398,601 | Seiferr | Apr. 16, 1946 |
| 2,439,356 | Arens | Apr. 6, 1948 |
| 2,497,127 | Lecarme | Feb. 14, 1950 |
| 2,505,020 | Weisman | Apr. 25, 1950 |
| 2,536,724 | Clay | Jan. 2, 1951 |
| 2,549,969 | Hesemann | Apr. 24, 1951 |
| 2,600,852 | Coots | June 17, 1952 |